US007941158B2

(12) United States Patent
Olson

(10) Patent No.: US 7,941,158 B2
(45) Date of Patent: May 10, 2011

(54) COMPUTERIZED MINE PRODUCTION SYSTEM

(75) Inventor: Jonathan P. Olson, Tucson, AZ (US)

(73) Assignee: Jigsaw Technologies, Inc., Tucson, AZ (US)

( * ) Notice: Subject to any disclaimer, the term of this patent is extended or adjusted under 35 U.S.C. 154(b) by 31 days.

(21) Appl. No.: 11/608,681

(22) Filed: Dec. 8, 2006

(65) Prior Publication Data
US 2007/0135137 A1    Jun. 14, 2007

Related U.S. Application Data

(60) Provisional application No. 60/749,218, filed on Dec. 9, 2005.

(51) Int. Cl.
*H04W 24/00* (2009.01)
(52) U.S. Cl. ............ 455/456.1; 701/207; 701/213; 701/1; 701/50; 700/28; 707/610
(58) Field of Classification Search .......... 455/456.1
See application file for complete search history.

(56) References Cited

U.S. PATENT DOCUMENTS

| | | | |
|---|---|---|---|
| 5,450,321 A | 9/1995 | Crane | |
| 6,505,106 B1 | 1/2003 | Lawrence et al. | 701/35 |
| 6,611,739 B1 | 8/2003 | Harvey et al. | 702/29 |
| 6,741,921 B2 * | 5/2004 | Cohen et al. | 701/50 |
| 6,895,329 B1 | 5/2005 | Wolfson | 701/209 |
| 2004/0006549 A1 * | 1/2004 | Mullins et al. | 707/1 |
| 2004/0024808 A1 * | 2/2004 | Taguchi et al. | 709/203 |
| 2005/0037787 A1 * | 2/2005 | Bachner et al. | 455/502 |
| 2005/0083196 A1 * | 4/2005 | Furem et al. | 340/539.16 |
| 2005/0107934 A1 * | 5/2005 | Gudat et al. | 701/50 |
| 2005/0120081 A1 * | 6/2005 | Ikenn | 709/203 |
| 2005/0222723 A1 | 10/2005 | Estes et al. | 701/33 |

OTHER PUBLICATIONS

C. H. Ta et al., A stochastic optimization approach to mine truck allocation, International Journal of Surface Mining, Reclamation and Environment, vol. 19, No. 3, Sep. 2005, pp. 162-165.*
Victor A. Temeng, Francis O. Otuonye, and James O. Frendeway Jr., Real-time truck dispatching using a transportation algorithm, International Journal of Mining, Reclamation and Environment, vol. 11, No. 4, pp. 203-207.*
C.H. Ta et al. ("Ta") A stochastic optimization approach to mine truck allocation. International Journal of Surface Mining, Reclamation and Environment. Sep. 2005, vol. 19 No. 3, pp. 162-175, especially section 2, pp. 164-166.

(Continued)

*Primary Examiner* — Rafael Pérez-Gutiérrez
*Assistant Examiner* — German Viana Di Prisco
(74) *Attorney, Agent, or Firm* — Maschoff Gilmore & Israelsen

(57) ABSTRACT

The system contains a central computer unit having a first database controlled by a first logic unit. At least one mobile computer unit is joined with the mobile equipment. Each of the mobile computer units has a second database controlled by a second logic unit. At least one wireless communication device enables communication between said first logic unit and said second logic unit, wherein said mobile computer unit is operable independent of the first logic unit.

46 Claims, 11 Drawing Sheets

OTHER PUBLICATIONS

Alexander Stage: "Synchronization and replication in the context of mobile applications", Joint Advanced Student School (JASS) Course 6 Next-Generation User-Centered Information Management, [Online], Apr. 2005, p. 1-16, XP002522573.

European Search Report, dated Oct. 2, 2009, application No. 06850909.0-1238 /1958466 PCT/US2006061810 (10 pgs).

"Synchronization and Replication in the Context of Mobile Applications", Joint Advanced Student School (JASS) Course 6 Next-Generation User-Centered Information Management, Apr. 2005, pp. 1-16.

Official Action received in Applicant's corresponding EPO Patent Application Serial No. 06 850 909.0-1238 , Jun. 25, 2010.

* cited by examiner

COMPUTERIZED MINE PRODUCTION SYSTEM

CROSS-REFERENCE TO RELATED APPLICATION

This application claims priority to copending U.S. Provisional Application entitled, "Computerized Mine Production System", having Ser. No. 60/749,218, filed Dec. 9, 2005, which is entirely incorporated herein by reference.

FIELD OF THE INVENTION

The present invention is generally related to a method and apparatus for tracking mobile objects within a predefined territory. The invention has particular utility for tracking the location, movement, and related activity of mobile machines at a mine production site and will be described in connection with such utility, although other utilities are contemplated.

BACKGROUND OF THE INVENTION

Several vendors have previously designed and deployed computerized mine production systems. Such vendors include Modular Mining Systems, Caterpillar, Wenco, and Tritronics. Although some of these systems have similar goals to present invention, the architecture of previously deployed systems were significantly different. Initially, these systems were developed using computers and wireless networking technologies available in the early 1980s. At this time, portable microprocessors were limited to approximately 8K to 32K of available RAM memory, 8K to 32K of ROM memory and had processing speeds of approximately 1 MHz. Wireless network technology at this time utilized narrow band UHF or VHF communications which limited the peak data rate to approximately 1200 to 9600 bits/second. Today, inexpensive mobile microprocessors easily provide hundreds of megabytes of RAM, gigabytes of flash storage, and operate at speeds of 1 GHz and higher. Similarly, wireless network technology has evolved to provide 11 to 54 megabits/second peak data transfer speeds. In summary, both microprocessor speeds and network bandwidth provide at least 1000 times more capacity than the technologies used in the design of the earlier mining systems.

The limited capability of computer technology used in the design of the earlier mining systems dictated a design in which most of the processing was performed by a single central computer. Mobile devices were simple interfaces which mostly transmitted button pushes and displayed text messages or very simple graphical interfaces. Existing prior art systems have a single centralized database, centralized control logic, and typically provide minimal data access capabilities for mobile equipment. Because mobile equipment cannot directly access the database, the mobile software typically communicates with the centralized business logic using short messages called RPCs (remote procedure calls).

Because existing mine control systems place all data and algorithms on the central computer, these systems must provide network availability close to 100% throughout the entire production area. Although this was possible with narrowband UHF and VHF technologies, new wireless networking technologies such as 802.11 often have shadow areas in which the network coverage is unavailable. With a centralized system design, mobile users cannot operate in areas where network coverage is unavailable. Coverage and communications issues often plague such installations since the system design cannot operate when the computer network is unavailable. Additionally, modem technologies for equipment monitoring such as video cameras, radars, or high-precision GPS require logic on-board the equipment. Integration of such devices into a system with only centralized control of equipment is impractical because of wireless bandwidth constraints.

Several vendors have designed and deployed mine production systems which monitor and control trucks in a mining operation. Many of these systems also perform automatic assignment and/or allocation of trucks to loading equipment. Current systems base their allocation strategy on either predetermined assignments stored in a central database, or a mathematical model, which determines optimal flow rates for trucks on each production path. Such allocation strategy models are fairly rigid, expecting all equipment to perform identically, while bearing identical loads and moving lockstep. Although such allocation strategies can perform well in theory, real life operation is less than ideal.

Thus, a heretofore unaddressed need exists in the industry to address the aforementioned deficiencies and inadequacies.

SUMMARY OF THE INVENTION

Embodiments of the present invention provide a system and method for tracking mobile equipment at a site. Briefly described, in architecture, one embodiment of the system, among others, can be implemented as follows. The system contains a central computer unit which includes computer usable medium having computer readable program code disposed therein, and having a first database controlled by a first logic unit. At least one mobile computer unit is joined with the mobile equipment. Each of the mobile computer units has a second database controlled by a second logic unit. At least one wireless communication device enables communication between said first logic unit and the second logic unit, wherein the mobile computer unit is operable independent of the first logic unit.

The present invention can also be viewed as providing methods for tracking mobile equipment at a site. In this regard, one embodiment of such a method, among others, can be broadly summarized by the following steps: tracking information regarding a status of the mobile equipment with a mobile computer unit joined to the mobile equipment; storing information regarding the status of the mobile equipment on the mobile computer unit joined to the mobile equipment; and transmitting information regarding the status of the mobile equipment from the mobile computer unit joined to the mobile equipment to a central computer unit.

Other systems, methods, features, and advantages of the present invention will be or become apparent upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
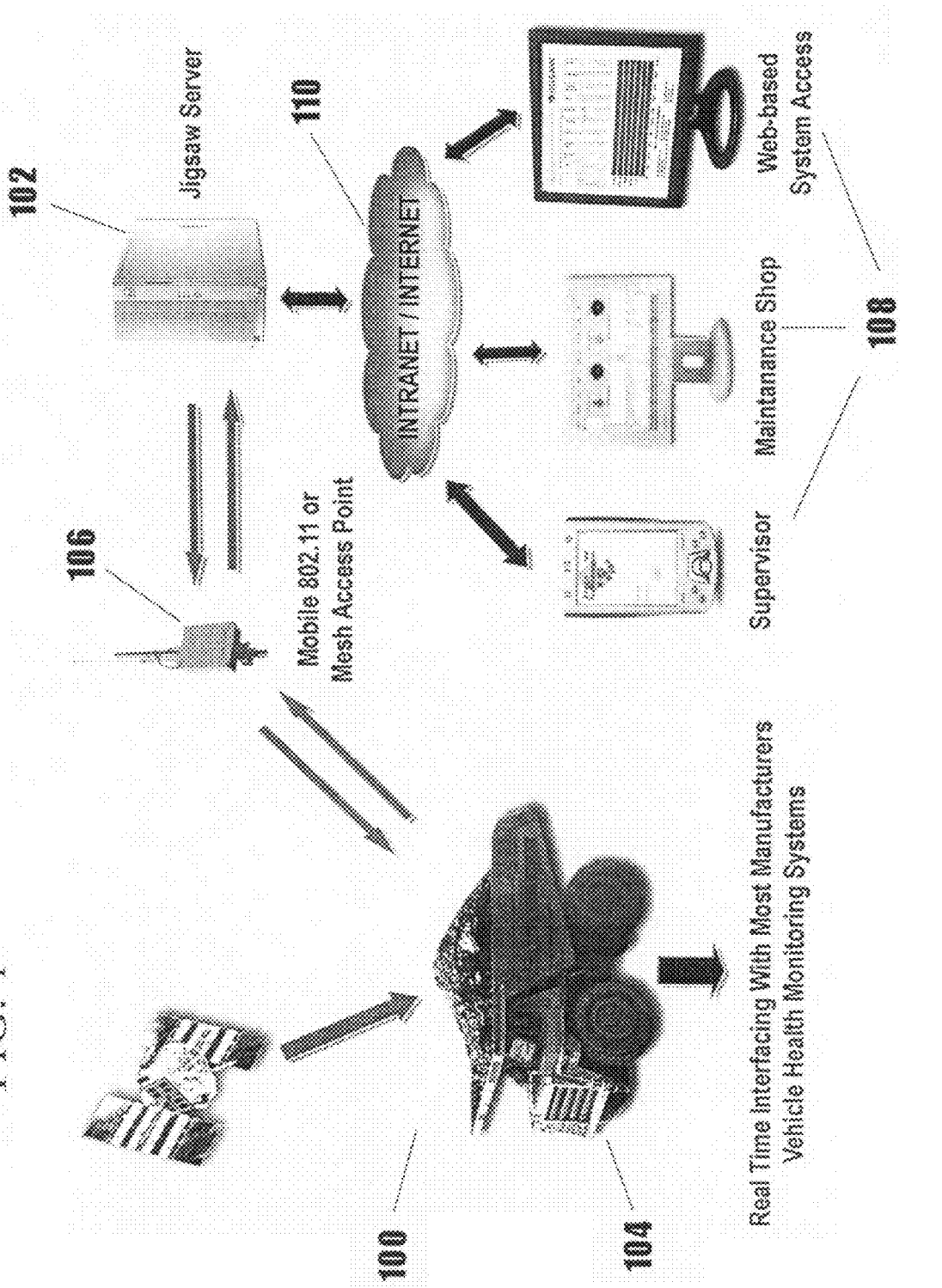
FIG. 1 is a first schematic representation of a mine production system, in accordance with a first exemplary embodiment of the present invention.
Figure 2:
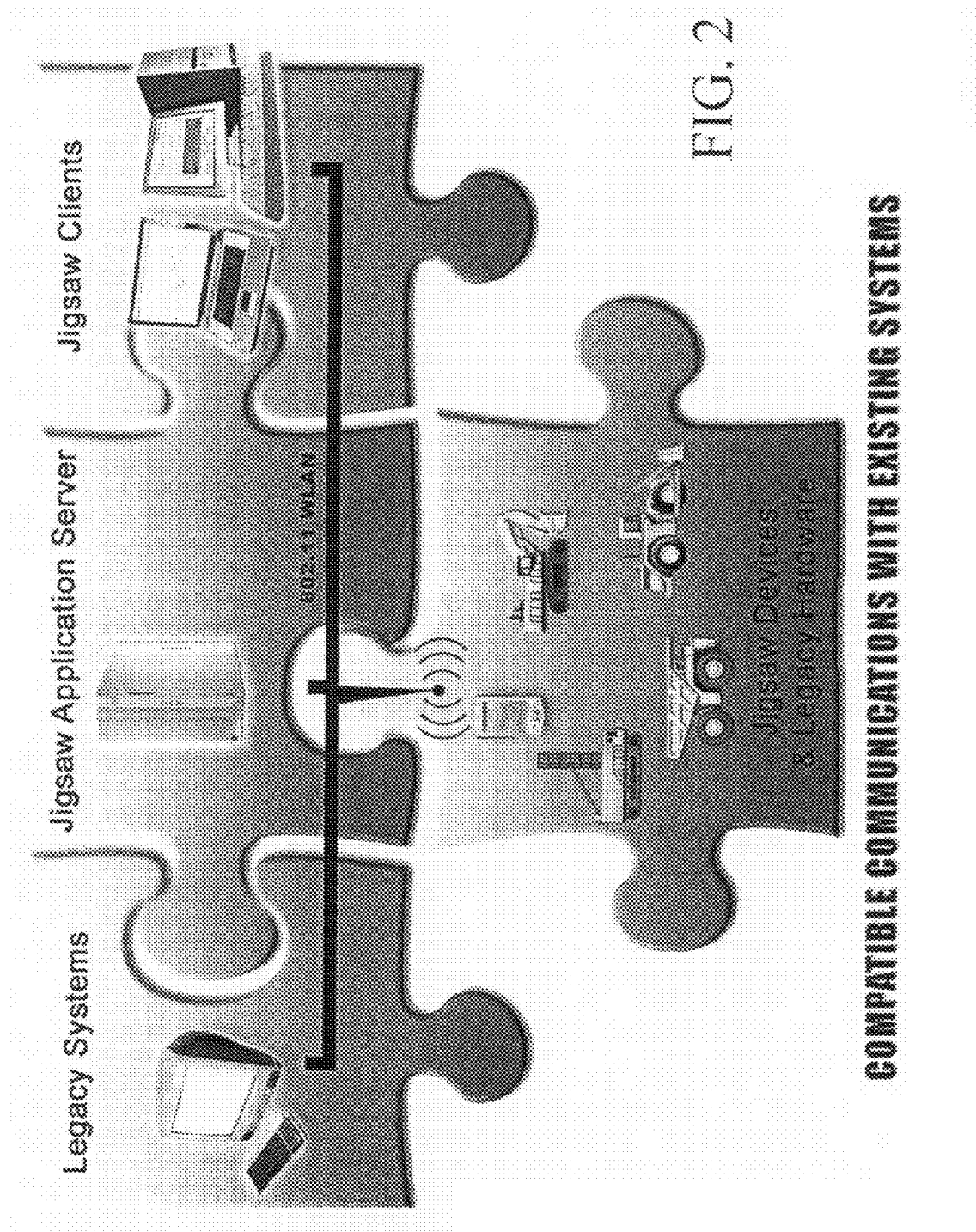
FIG. 2 is a second schematic representation of the mine production system, in accordance with the first exemplary embodiment of the present invention.
Figure 3:
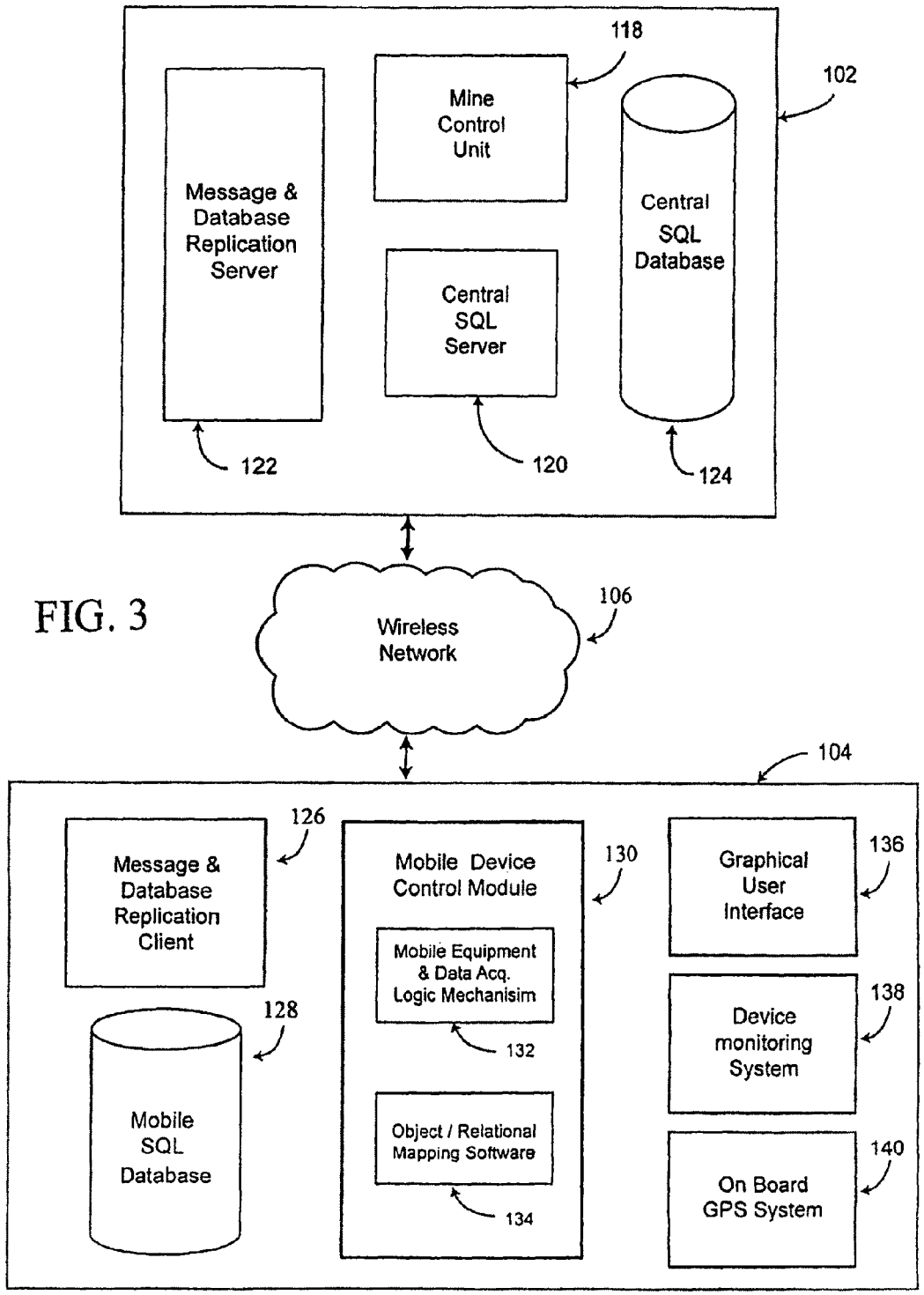
FIG. 3 is a block diagram of the mine production system, in accordance with the first exemplary embodiment of the present invention.

Referring to FIGS. 1-3, the mine production system 100 in accordance with a first exemplary embodiment of the present invention may be used to create a comprehensive data acquisition, communications, control, and optimization system for the mining industry. The mine production system 100 includes an SQL database 124 on a central computer unit 102. The SQL database 124 is in communication with a plurality of mobile computer units 105 located on mobile equipment 104. That communication with a plurality of computers located on mobile equipment is achieved with a plurality of wireless communication devices 106, which may be located with or within the central computer unit 102, with or within the mobile equipment 104, and/or at other points local to a site. The central computer unit 102 is also in communication with at least one user access point 108, which may allow a user or electronic agent to manage the activity of the mobile equipment 104.

The plurality of mobile computer units 105 located on the mobile equipment 104 may include control and graphic display computers using modern wireless systems such as 802.11b, 802.11g or other IP based wireless network technology. At least one of the mobile computer units 105 located on the mobile equipment 104 may utilize GPS positioning technology to periodically track a position, speed, and heading of the mobile equipment 104. The mobile computer units 105 located on the mobile equipment 104 may interface with one or more existing on-board monitoring systems that provide information such as payload, engine status, tire pressure, or other relevant data.

The mine production system 100 may be utilized to increase efficiency of the mining haulage cycle by continuously monitoring the location and status of all trucks, shovels and support equipment in the mine, and making optimal work assignments. Mines that employ computer optimization systems typically achieve significant gains in equipment operating time, productivity, and cost savings.

The at least one access point 108 to access information regarding the mine production system 100 or any of the mobile devices connected to the mine production system 100 may operate through an Intranet or the Internet 110. The access point 108 may be accessed through computers on the mobile equipment 104, PCs, laptops, PDAs, or other electronic devices capable of interacting with the central computer unit 102 using wired and/or wireless communication positioned locally or remotely.

Referring in particular to FIG. 3, the central computer unit 102 communicates with the plurality of mobile computer units 105 located on the mobile equipment 104 through the wireless communication devices 106. The wireless communication devices 106 may be located with or within the central computer unit 102, with or within the mobile equipment 104, and/or at other points local to a site. The central computer unit 102 comprises one or more general-purpose computers as described herein in relation to FIG. 4. The central computer unit 102 may include a mine control unit 118, a central SQL database server 120, a central SQL database 124, and/or a messaging and database replication server 122. The mine control unit 118 may control the operation of the mine production system 100, in whole or in part. That is, the mine control unit 118 may operate and store at least some of the logic and software routines useful to controlling operation of the mine.

The central SQL database server 120 may control access to and distribute information from the central SQL database 124. The central SQL database 124 may store at least some of the information useful to control operations of the mine production system 100. Tables contained in the central SQL database 124 may contain real-time and/or historical operating data including, but not limited to, the location and/or health of the mobile equipment 104, performance information, etc. The central SQL database 124 may also contain data regarding the mining site, including, but not limited to known paths along the site, grades and conditions of the paths, and similar information. Some data regarding the mining site may be collected based on the travels of the mobile equipment and communication with the mobile computer unit.

The mine production system 100 is known to be operable using a PostgreSQL database for the central SQL database 124 described herein, although other commercially available or privately designed databases may be used for the central SQL database 124 without departing from the scope of the present invention. The central SQL database 124 may also be able to interface to other database servers such as, but not limited to, MySQL, Oracle, or SQL Server through the central SQL database server 120.

The central SQL server 120 may be in communication with the messaging and database replication server 122. This communication may be used to receive, process and/or update information for the central SQL database 124. That communication may further be used to replicate updated information to one or more of the plurality of mobile computer units 105 located on the mobile equipment 104. The central SQL server 120 may also be able to interface with other mining systems.

The plurality of mobile computer units 105 located on the mobile equipment 104 may include a messaging and database replication client 126. The messaging and database replication client 126 may communicate through the wireless communication devices 106 with the messaging and database replication server 122. The messaging and database replication client 126 may upload local changes to and/or receive replication updates from the messaging and database replication server 122. The messaging and database replication client 126 may further handle central SQL database 124 queries and database notifications with on-board clients. The messaging and database replication client 126 may be used to copy some or all of the data stored on the central SQL database 124.

The plurality of mobile computer units 105 located on the mobile equipment 104 may include a mobile SQL database 128. The mobile SQL database 128 may be a duplicate of the central SQL database 124. It may be periodically, regularly, and/or continually updated and synchronized with the central SQL database 124. Updating and synchronization of the mobile SQL database 128 may be achieved through the messaging and database replication client 126. If one of the mobile computer units 105 located on the mobile equipment 104 loses contact with central computer unit 102, the mobile SQL database 128 may store any local changes. The mobile computer units 105 located on the mobile equipment 104 may be designed to primarily or solely use the mobile SQL database 128 when the central SQL database 124 is unavailable. Once the network connection for the mobile computer units 105 located on the mobile equipment 104 is restored, the central SQL database 124 and the mobile SQL database 128 may be synchronized. The mobile SQL database 128, for example, may utilize the open-source sqlite (www.sqlite.org) database, which provides a lightweight embedded SQL database, although other commercially available or otherwise created databases may similarly be utilized without departing from the scope of the present invention.

One possible table in the mobile SQL server 128 is a distributed system configuration table. The configuration of at least some of the devices is stored in the distributed system configuration table. At boot time, at least some of the devices may query the mobile SQL database 128 to initiate software modules unique to that device. This architecture may allow centralized configuration of the mine production system 100 software on the mobile equipment 104.

The plurality of mobile computer units 105 located on the mobile equipment 104 may include a mobile device control module 130, a device monitoring system 138, and an on-board GPS system 140. The mobile device control module 130 may run the mine production system 100 software on the mobile equipment 104. The device monitoring system 138 may be able to accurately determine speed and position of the mobile equipment at regular intervals, if not continuously. The speed and position may be tracked and stored as information on the mobile computer unit 105. The speed and position information may be stored with a time stamp at regular intervals, if not continuously.

The mobile device control module 130 may include a mobile equipment control and data acquisition logic mechanism 132. The mobile equipment control and data acquisition logic mechanism 132 may interface with the on-board GPS system 140 and the device monitoring system 138. The mobile equipment control and data acquisition logic mechanism 132 may also track the current activity and status of the mobile equipment 104 and compute and/or store production information from the mobile SQL database 128. The mobile equipment control and data acquisition logic mechanism 132 may periodically or continuously calculate an arrival time to a known destination, based on speed and position data. The calculated arrival time may be periodically or continuously related to the central computer unit 102. The mobile control module 130 may also include an object/relational mapping software 134. The object/relational mapping software 134 may map one or more SQL relational database tables to an object model used by the mobile equipment control and data acquisition logic mechanism 132 and maintain referential integrity in the mobile SQL database 128.

An operator of the mobile equipment 104 may interface with one or more mobile computer units 105 on the mobile equipment 104 through a graphical user interface (GUI) 136. The GUI 136 may allow the user to interact with the mobile device control module 130, perform queries against the mobile SQL database 128, and/or receive database update notifications. The GUI 136 may present a rich graphical interface to the operator, displaying a map with all the roads, current location of all equipment, and other on-board status information.

Figure 5:
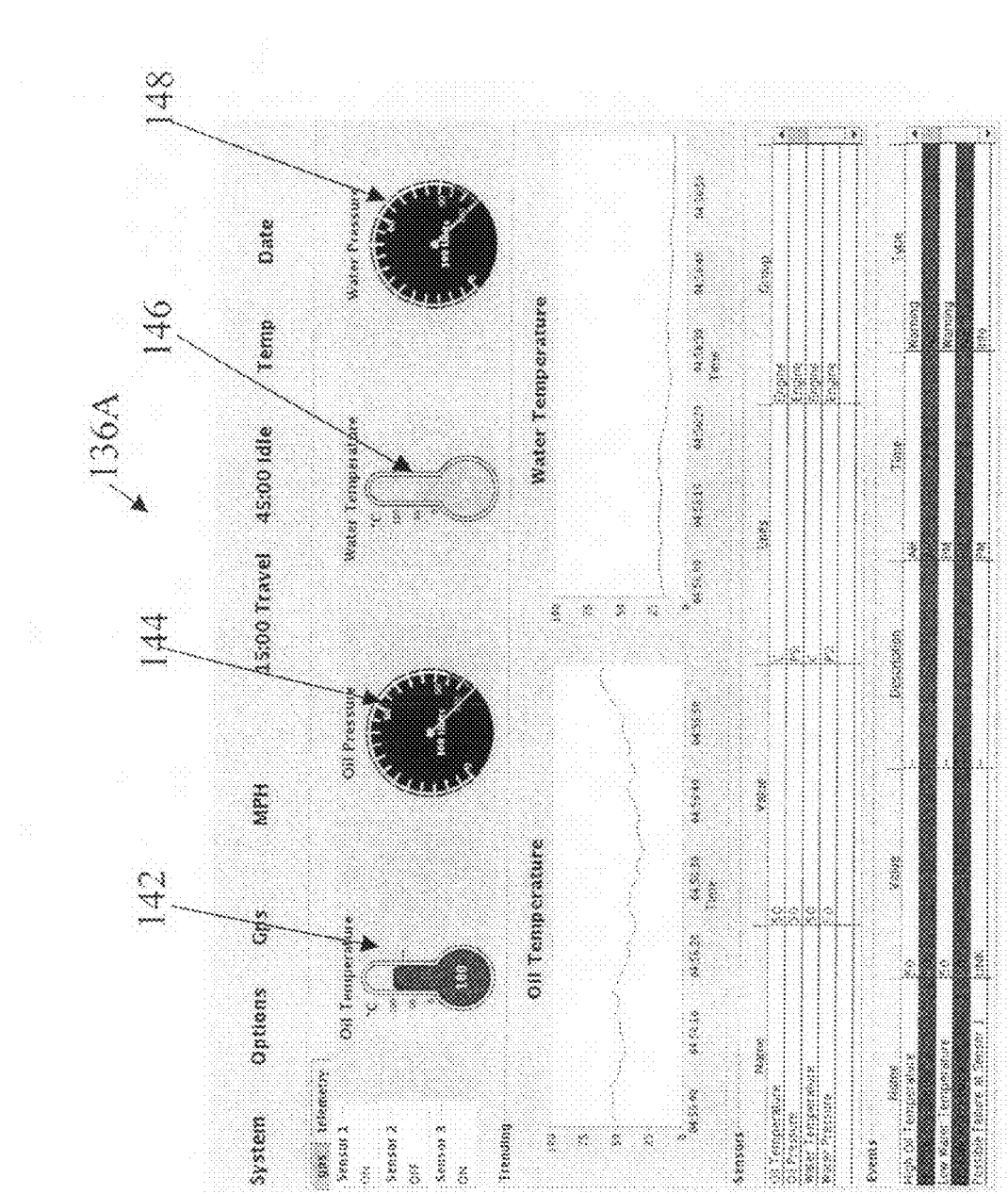
FIG. 5 is a first graphical user interface view for the mine production system, in accordance with the first exemplary embodiment of the present invention.

FIG. 5 is a first graphical user interface 136A view for the mine production system 100, in accordance with the first exemplary embodiment of the present invention. The first GUI 136A view is of a vehicle health display GUI. The mining production system 100 may allow the user real-time access to data for the vehicle health monitoring systems, including, for example, oil temperature 142, oil pressure 144, water temperature 146, and water pressure 148, as well as charting the values for that data over time and showing an alarm state if values for that data reach a predetermined alarm value. The mining production system 100 may also allow the user to perform trend analysis of at least a portion of current data and/or historical data, which may be accessible within one or more mobile computer units 105 on the mobile equipment 104 or through the wireless communication devices 106.

Figure 6:
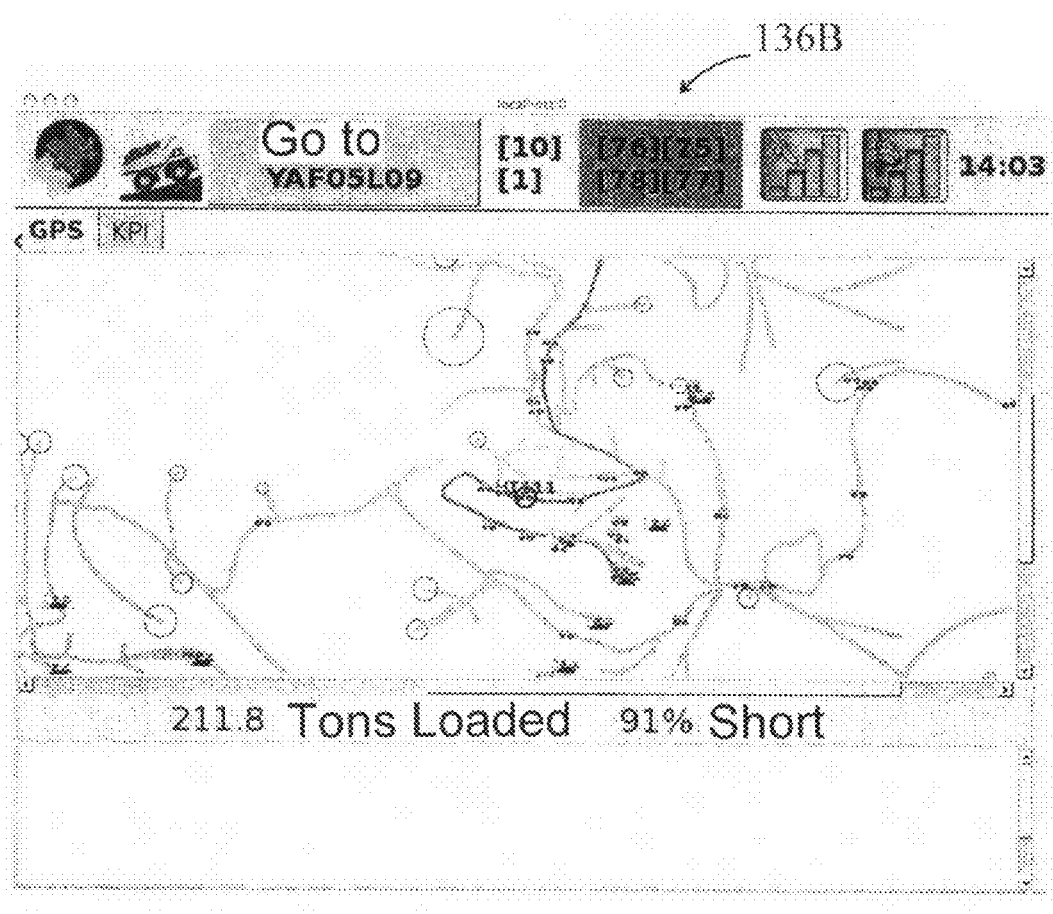
FIG. 6 is a second graphical user interface view for the mine production system, in accordance with the first exemplary embodiment of the present invention.

FIG. 6 is a second graphical user interface 136B view for the mine production system 100, in accordance with the first exemplary embodiment of the present invention. One of the possible features of the mine production system 100 includes an ability to calculate a preferred travel path for mobile equipment 104 in the mine. The second GUI 136B view shown in FIG. 6 is related to this feature. The second GUI 136B view may display detailed path information for each loaded truck and automatic audio-visual alarms for misrouted loads. Additionally, GPS velocity information and real-time comparison with planned values can be displayed.

Figure 7:
FIG. 7 is a third graphical user interface view for the mine production system, in accordance with the first exemplary embodiment of the present invention.

FIG. 7 is a third graphical user interface view 136C for the mine production system 100, in accordance with the first exemplary embodiment of the present invention. As shown in FIG. 7, the mine production system 100 may provide a detailed GPS 136C view of one or more excavator locations and update excavator movement to all field units.

Figure 8:
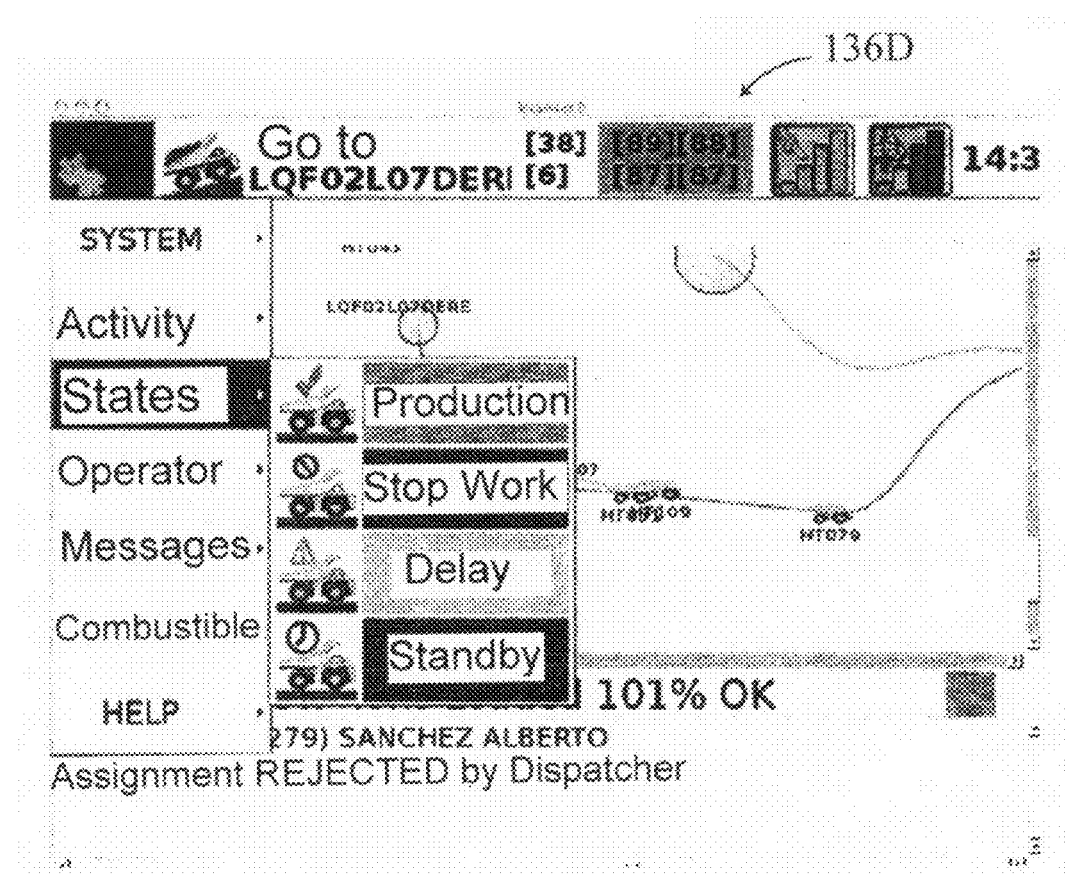
FIG. 8 is a fourth graphical user interface view for the mine production system, in accordance with the first exemplary embodiment of the present invention.
Figure 9:
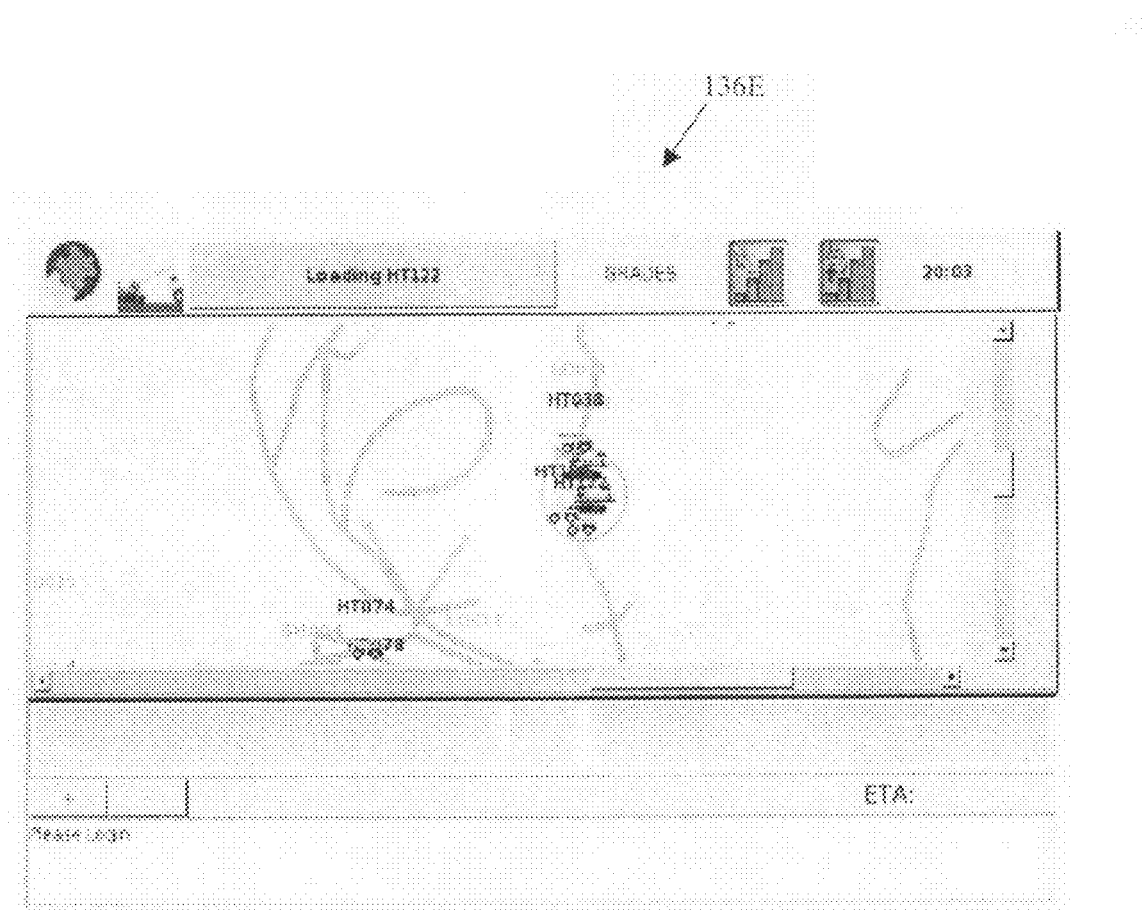
FIG. 9 is a fifth graphical user interface view for the mine production system, in accordance with the first exemplary embodiment of the present invention.

FIG. 8 is a fourth graphical user interface 136D view for the mine production system 100, in accordance with the first exemplary embodiment of the present invention, and FIG. 9 is a fifth graphical user interface 136E view for the mine production system 100, in accordance with the first exemplary embodiment of the present invention. The fourth GUI 136D view is a mobile unit bench display, which may include an ability to display different layers of information. The fifth GUI 136E view is a sample loading unit display. The mine production system 100 may load bench information from a mine-planning package and allow the user to query the mine production system 100 for complete polygon information from one or more active benches.

Figure 10:
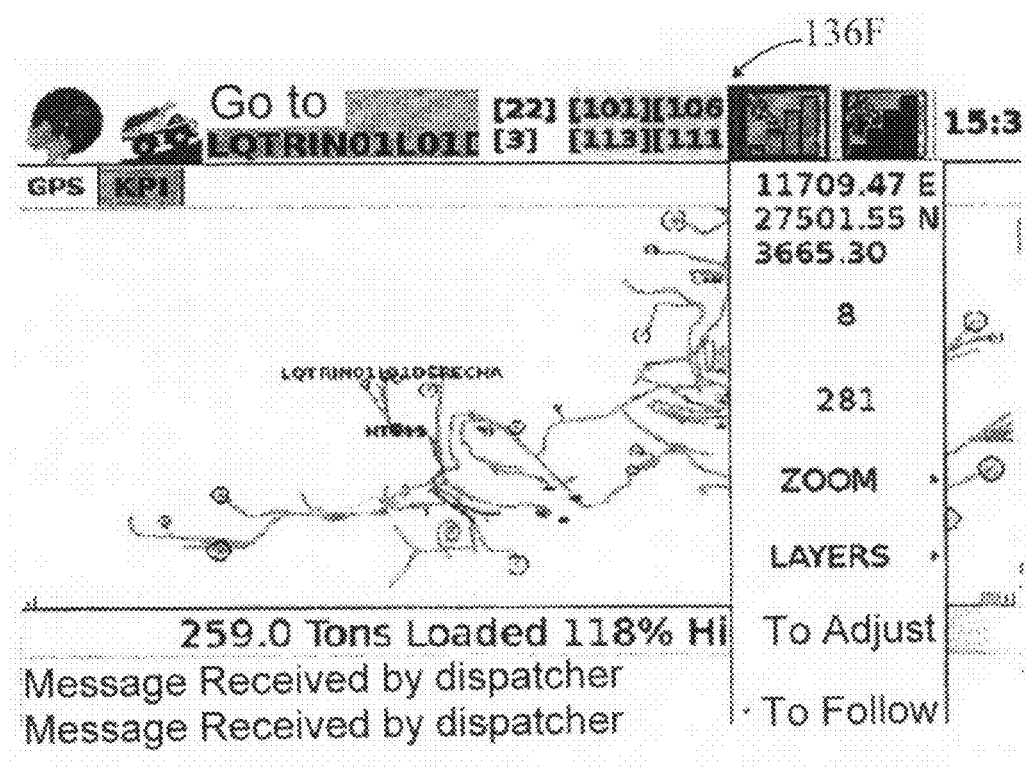
FIG. 10 is a sixth graphical user interface view for the mine production system, in accordance with the first exemplary embodiment of the present invention.

FIG. 10 is a sixth graphical user interface 136F view for the mine production system 100, in accordance with the first exemplary embodiment of the present invention. The sixth GUI 136F view contains active dump information. The user may use the GUI 136 to track dump information, perform trend analysis for dumping rates, and coordinate with sub-3 meter accuracy on dumping locations.

Figure 11:
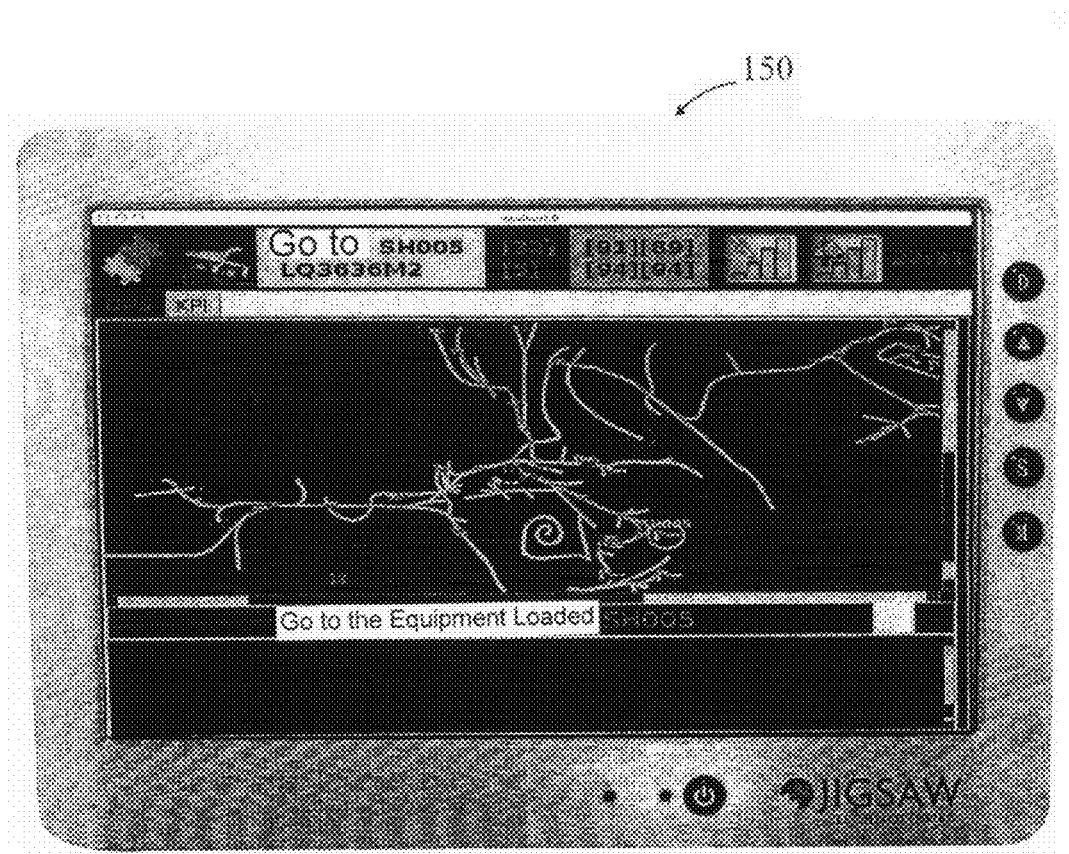
FIG. 11 is a front view of a mobile electronic device used with the mine production system, in accordance with the first exemplary embodiment of the present invention.

FIG. 11 is a front view of a mobile electronic device 150 used with the mine production system 100, in accordance with the first exemplary embodiment of the present invention. The mobile electronic device 150 may, for instance, include platform-independent software application(s) that can be deployed in any commercially available ruggedized computer. The mobile electronic device 150, for example, may be equipped with external 2.4Ghz antennas, GPS receivers and serial interface capabilities that can communicate locally with the health monitoring systems of the mobile equipment 104, and with the central computer unit 102 via a standard 802.11x or infrastructure for any other wireless communication devices 106. Those having ordinary skill in the art will recognize that similar equipment having varying specifications may be used in conjunction with the mobile electronic device 150 without departing from the scope of the present invention.

The mine production system 100 can be implemented in hardware, software, firmware, or a combination thereof. The mine production system may be implemented in software or firmware that is stored in a memory and that is executed by a suitable instruction execution system. If implemented in hardware, the mine production system 100 can be implemented, for example, with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The mine production system 100 can be implemented in software (e.g., firmware), hardware, or a combination thereof. The mine production system 100 may be implemented in software, as an executable program, and is executed by a special or general-purpose digital computer, such as a personal computer (PC; IBM-compatible, Apple-compatible, or otherwise), workstation, minicomputer, or mainframe computer.

Figure 4:
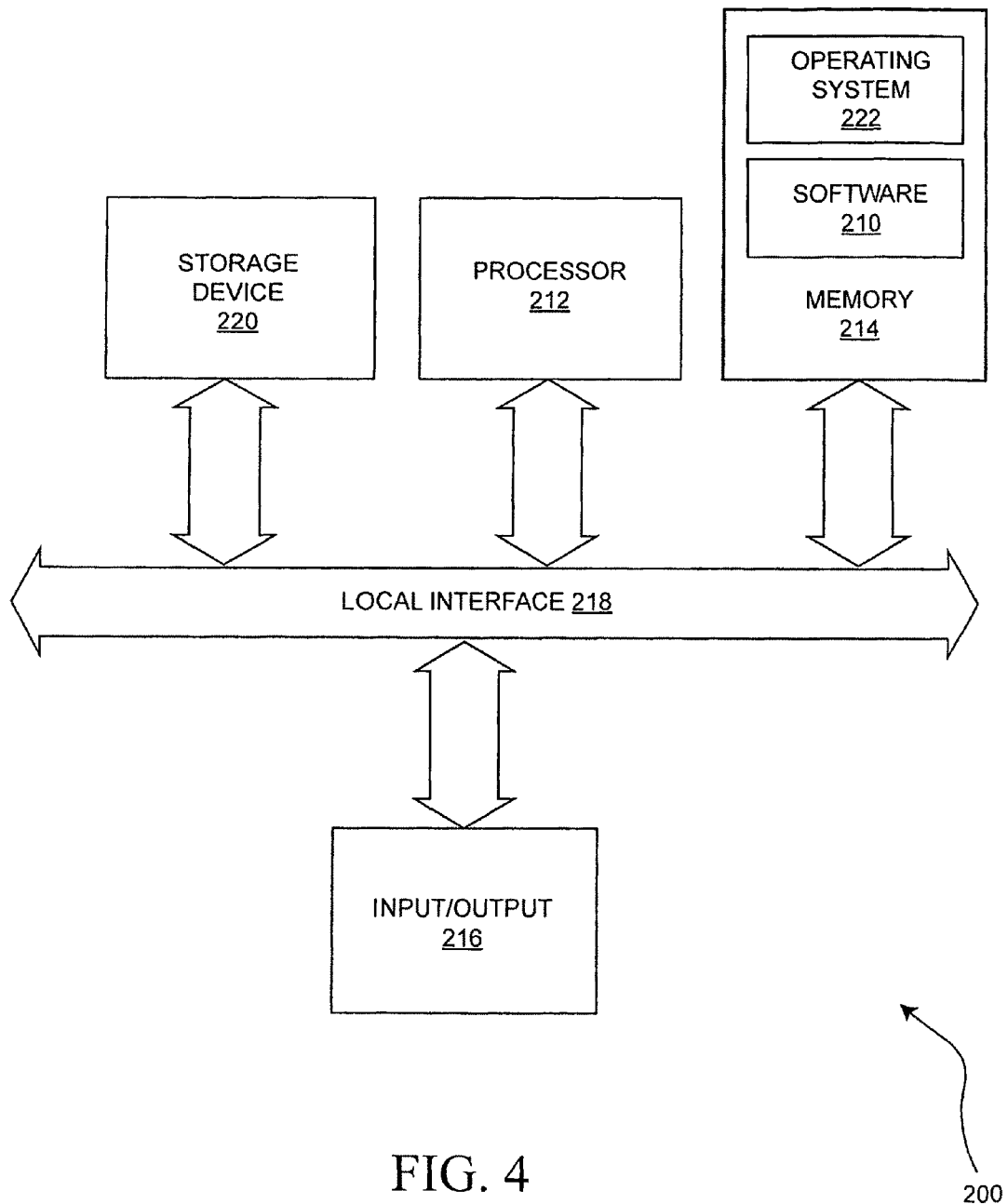
FIG. 4 is a block diagram of an exemplary general purpose computer for the mine production system, in accordance with the first exemplary embodiment of the present invention.

FIG. 4 is a block diagram of an exemplary general-purpose computer 200 for the mine production system 100, in accordance with the first exemplary embodiment of the present invention. Generally, in terms of hardware architecture, the general-purpose computer 200 includes a processor 212, a memory 214, and one or more input and/or output (I/O) device(s) 216 (or peripherals) that are communicatively coupled via a local interface 218. The local interface 218 can be, for example but not limited to, one or more buses or other wired or wireless connections, as is known to those having ordinary skill art. The local interface 218 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 212 is a hardware device for executing software, particularly that stored in memory 214. The processor 212 can be any custom made or commercially available processor, a central processing unit (CPU), an auxiliary processor among several processors associated with the general-purpose computer 200, a semiconductor based microprocessor (in the form of a microchip or chip set), a macroprocessor, or generally any device for executing software instructions. Examples of suitable commercially available microprocessors include PA-RISC series microprocessors from Hewlett-Packard Company, 80×86 or Pentium series microprocessors from Intel Corporation, PowerPC microprocessors from IBM, Sparc microprocessors from Sun Microsystems, Inc, and 68xxx series microprocessors from Motorola Corporation.

The memory 214 can include any one or combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, the memory 214 may incorporate electronic, magnetic, optical, and/or other types of storage media. Note that the memory 214 can have a distributed architecture, where various components are situated remote from one another, but can be accessed by the processor 212.

The software 210 in memory 214 may include one or more separate programs, each of which comprises an ordered listing of executable instructions for implementing logical functions. In the example of FIG. 4, the software 210 in the memory 214 may include the mine production system 100 as described herein.

The memory 214 may further include a suitable operating system (O/S) 222. A nonexhaustive list of examples of suitable commercially available operating systems 222 include: Windows operating systems available from Microsoft Corporation; Netware operating systems available from Novell, Inc.; Macintosh operating systems available from Apple Computer, Inc.; UNIX operating systems which are available from many vendors including Hewlett-Packard Company, Sun Microsystems, Inc., and AT&T Corporation; LINUX operating systems, which are freeware that are readily available on the Internet; and appliance-based operating systems, such as that implemented in handheld computers or personal data assistants (PDAs) (e.g., PalmOS available from Palm Computing, Inc., and Windows CE available from Microsoft Corporation). The operating system 222 essentially controls the execution of other computer programs, such as the mine production system 100, and provides scheduling, input-output control, file and data management, memory management, and communication control and related services.

The software 210 may include a source program, an executable program (object code), a script, or any other entity comprising a set of instructions to be performed. When a source program, then the program needs to be translated via a compiler, assembler, interpreter, or the like, which may or may not be included within the memory 214, so as to operate properly in connection with the O/S 222. Furthermore, the software 210 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. The core messaging system used for the mine production system 100 may be written in objective-C and pure Java to assure portability to any operating system.

The I/O devices 216 may include input devices, for example but not limited to, a keyboard, mouse, scanner, microphone, touchscreen, etc. The I/O devices 216 may also include output devices, for example but not limited to, a printer, display, etc. The I/O devices 216 may further include devices that communicate both inputs and outputs, for instance but not limited to, a modulator/demodulator (modem; for accessing another device, system, or network), a radio frequency (RF) or other transceiver, a telephonic interface, a bridge, a router, wireless router, etc.

If the general-purpose computer 200 is a PC, workstation, or the like, the software 210 in the memory 214 may further include a basic input output system (BIOS) (omitted for simplicity). The BIOS is a set of essential software routines that initialize and test hardware at startup, start the O/S 222, and support the transfer of data among the hardware devices. The BIOS is stored in ROM so that the BIOS can be executed when the general-purpose computer 200 is activated.

When the general-purpose computer 200 is in operation, the processor 212 may be configured to execute software 210 stored within the memory 214, to communicate data to and from the memory 214, and to generally control operations of the general-purpose computer 200 pursuant to the software 210. The O/S 222, may be read by the processor 212, perhaps buffered within the processor 212, and then executed.

When the mine production system 100 is at least partially implemented in software 210, as is shown in FIG. 4, it should be noted that portions of the mine production system 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The mine production system 100 can be embodied, in part, in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store or transport the program for use by or in connection with the instruction execution system, apparatus, or device. The computer readable medium can be, for example but not limited to, an electronic, magnetic, optical, or semiconductor system, apparatus, or device. More specific examples (a nonexhaustive list) of the computer readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD-ROM) (optical).

Using accurate position information derived as described herein, a truck allocation algorithm, stored in logic units of the central computer unit 102 and/or the mobile computer units 105, may compute a set of optimal truck assignments which minimize excess travel time, truck waiting time, and shovel idle time. By way of example, the algorithm may compute and/or manipulate one or more of the following variables:

N(t) The total number of trucks being allocated.
N(l) The total number of loading units being allocated.
T(i) The travel time for the i'th LP selected path
F(i) The target feed rate for the i'th LP selected path.
R(i) The current moving average feed rate allocated to the i'th LP selected path.
S(j) The j'th assignment set of truck allocations to paths feeding loading units.
T(j) The excess travel time incurred by all trucks in the j'th assignment set
X(T) Relative cost weighting factor for excess travel time
W(j) The total truck waiting time incurred by all trucks in the j'th assignment set
X(W) Relative cost weighting factor for truck waiting time
I(j) The total loading unit idle time incurred by all shovels in the j'th assignment set.
X(I) Relative cost weighting factor for loading unit idle time
C(j) Cost function of S(j), evaluated as X(T)*T(j)+X(W)*W(j)+X(I)*I(j)

Each discrete mobile equipment 104 assignment affects a truck waiting time W(j) and loading unit idle time I(j) for all other assignments. The assignments of the individual mobile equipment 104 can be coordinated to improve efficiency. The total T(j), W(j), and I(j) for each assignment set S(j) may be evaluated and compared.

Because the total number of possible assignment sets is $N(l)**N(t)$, performing an exhaustive search of all possible assignment sets may be undesirable. For example, a typical mining operation could have 10 or more loading units and 50 or more trucks, making the total number of possible assignments $10^{50}$. It may also be undesirable to investigate all possible assignment sets because a goal of the discrete assignment algorithm is to minimizes waiting, idle, and travel times for a given assignment set and vetting $10^{50}$ possible assignments could generate additional delays. This algorithm may be constructed to avoid all the blending, digging rate, dumping capacity, and other constraints already optimized in the LP optimization algorithm. Thus, the assignment algorithm may be constrained to only investigate those assignment sets which closely match an optimal LP selected feed rates F(i), which greatly decreases the dimensionality of the search.

The truck assignment algorithm consists of the following steps: creating an assignment set S which includes an ordered queue of all mobile equipment 104 currently assigned to each loading unit; finding the neediest path P(j) which minimizes T(i)*(R(i)-F (i)); evaluating C(j) for allocating each unallocated truck, A(j) to path, P(j); and for the smallest N values of C(j), allocating truck A(j) to the assignment set S(j) and repeat the algorithm at step 2.

The algorithm may continue until the assignment set with minimum cost C(j) is found. Note that the dimensionality of this algorithm increases proportional to $N^2$, where N is the number of potential assignments evaluated for each truck. In practice, small values of N (eg. N=2 to N=4) yield optimal results, since higher values of cost C(j) are increasingly unlikely to yield optimal values for the assignment set S(j).

It should be emphasized that the above-described embodiments of the present invention are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. A system for tracking the location, movement and activity status of mobile equipment at a remote working site comprising:
a central computer unit remote from the working site having access to information in a first database controlled by a first logic unit;
at least one mobile computer unit joined with a respective mobile equipment unit, each of the at least one mobile computer units having access to information in a second database controlled by a second logic unit, wherein the second database contains at least one database, the mobile computer unit being configured to collect and transmit to the central computer unit data describing known paths along the working site as well as data describing grades and conditions of the paths, wherein data describing the known paths along the working site, paths, and conditions of the paths are collected based on travels of the mobile equipment unit and communication with the at least one mobile computer unit;

a programmable mapping system in communication with the second logic unit and situated to map the at least one database to an object model used by the second logic unit and maintain a referential integrity within the at least one database; and at least one wireless communication device enabling communication between said first logic unit and said second logic unit, wherein said mobile computer unit is operable independently of the first logic unit utilizing information in said second database while communication with said first logic unit is interrupted;

said central computer unit in communication with the first logic unit and in communication with the second logic unit, whereby the central computer unit issues commands to the second logic unit through said wireless communication network to update the information in the second database with information from the first database facilitating said mobile computer unit being operable independently of the first logic unit utilizing information in said second database while communication with said first logic unit is interrupted, wherein information from at least one of the first database and the second database is used to perform trend analysis of at least one of current data, historical data, or a combination thereof.

2. The system of claim 1, wherein the site comprises a mining site.

3. The system of claim 1, further comprising an access point in communication with the central computer unit and in communication with the Internet, wherein the second database is accessible through the Internet, the access point, and the central computer unit.

4. The system of claim 1, wherein the wireless communication devices enable communication between a plurality of second logic units.

5. The system of claim 1, further comprising a messaging and database replication server in communication with the first logic unit and a message and database replication client in communication with the second logic unit, whereby the messaging and database replication client uploads local changes to the messaging and database replication server, which changes are communicated to the first logic unit.

6. The system of claim 1, wherein information/commands communicated between the at least one mobile computer and the central computer are periodically updated.

7. The system of claim 1, wherein information/commands communicated between the at least one mobile computer and the central computer are regularly updated.

8. The system of claim 1, wherein different layers of information are communicated.

9. The system of claim 8, wherein the layers of information are selected from the group consisting of vehicle health information, payload information, vehicle position, vehicle speed and vehicle direction.

10. A method for tracking the location, movement and activity status of mobile equipment at a mobile equipment working site, said method comprising the steps of:

tracking information regarding a status of the mobile equipment with a mobile computer unit joined to a respective mobile equipment unit;

storing information regarding the location, movement and/or activity status of the respective mobile equipment unit on the mobile computer unit joined to the respective mobile equipment unit, wherein the information regarding the location, movement and/or activity status of the mobile equipment unit is stored within a database on the mobile computer unit, wherein the database contains at least one database;

mapping the at least one database to an object model used by a logic unit within the mobile computer unit with a programmable mapping system in communication with the logic unit, thereby maintaining; a referential integrity within the at least one database;

transmitting information regarding the location, movement and/or activity status of the mobile equipment unit from the mobile computer unit joined to the respective mobile equipment to a central computer unit emote from the working site; and synchronizing a first plurality of data stored in a second database with a second plurality of data stored in said second database, whereby the synchronized data in said second database is utilized by said mobile computer unit when communication between said central computer unit and said mobile computer unit is interrupted, wherein the information regarding at least one of the location, movement and activity status of the respective mobile equipment unit is used to perform trend analysis of at least one of current data, historical data, or a combination thereof;

assigning tasks for mobile equipment including:
  a first step of creating an assignment set including an ordered queue of the mobile equipment assigned to each loading unit;
  a second step of finding a neediest path which minimizes (mobile equipment travel time) * ((average feed rate of the path)-(target feed rate for the path));
  a third step of evaluating cost for allocating each unallocated truck to the path using a weighted algorithm of excess travel time incurred by all trucks in an assignment set, the total truck waiting time incurred by all trucks in the assignment set, and a total loading unit idle time incurred by all shovels in the assignment set;
  a fourth step of for the smallest total truck value for cost, allocating one of the mobile equipment to the assignment set; and
  a fifth step of repeating said second through fourth steps until the assignment set with a minimum total cost is found.

11. The method of claim 10, further comprising the steps of: receiving instruction from the central computer unit at the mobile computer unit; interrupting communication between the central computer unit and the mobile computer unit; and directing the mobile equipment to act with the mobile computer unit based on the received instruction and the synchronized data in said second database while communication is interrupted.

12. The method of claim 10, wherein the step of tracking information further comprises tracking a location of the mobile equipment.

13. The method of claim 10, wherein the step of tracking information further comprises tracking functionality data of the mobile equipment.

14. The method of claim 10, further comprising predicting an arrival time for a predetermined destination using the mobile computer unit; and relaying the predicted arrival time to the central computer unit.

15. The method of claim 10, wherein information between the at least one mobile computer unit and the central computer is transmitted periodically.

16. The method of claim 10, wherein information between the at least one mobile computer unit and the central computer is transmitted regularly.

17. The method of claim 10, including the step of transmitting different layers of information.

18. The method of claim 17, wherein the layers of information are selected from the group consisting of vehicle health information, payload information, vehicle position, vehicle speed and vehicle direction.

19. The method of claim 10, further comprising enabling an operator the mobile equipment to use a graphical user interface to track dump information, perform trend analysis for dumping rates, and coordinate accurate data with dumping locations.

20. A system for tracking the location, movement and activity status of mobile equipment at a remote working site comprising:
   means for tracking information regarding a the location, movement and/or activity status of a respective mobile equipment unit;
   means for storing information regarding the status of the respective mobile equipment unit on the respective mobile equipment unit, wherein the information regarding the status of the mobile equipment unit is stored within a database on a mobile computer unit, wherein the database contains at least one database;
   means for mapping the at least one database to an object model used by a logic unit within the mobile computer unit, thereby maintaining a referential integrity within the at least one database;
   means for transmitting information regarding the status of the respective mobile equipment unit from the respective mobile equipment unit to a central computer unit for incorporation into a central database remote from the site;
   a graphical user interface on the mobile equipment unit, the graphical user interface displaying a map including all roads of the work site, the current locations of all mobile equipment units on the remote working site as well as path information for each loaded mobile equipment unit, the graphical user interface further displaying an audio-visual alarm for misrouted loads as well as GPS velocity information along with real-time comparison with planned values;
   means for synchronizing a plurality of data stored in the means for storing information on the respective mobile equipment unit with a plurality of data stored in the central database and synchronizing a plurality of data stored in the central database with a plurality of data stored in the means for storing information on the respective mobile equipment unit;
   whereby the synchronized data stored in the means for storing information on the respective mobile equipment unit is utilized by the system for control when communication between said central computer unit and said mobile equipment is interrupted, wherein the information regarding at least one of the location, movement and activity status of the respective mobile equipment unit is used to perform trend analysis of at least one of current data, historical data, or a combination thereof.

21. The system of claim 20, further comprising:
   means for receiving instruction from the central computer unit at the mobile equipment;
   interrupting communication between the central computer unit and the mobile equipment; and
   directing the mobile equipment to act based on the received instruction and the synchronized data stored in the mobile equipment while communication is interrupted.

22. The system of claim 20, wherein the means for transmitting information transmits the information periodically.

23. The system of claim 20, wherein the means for transmitting information transmits the information regularly.

24. The system of claim 20, wherein different layers of information are communicated.

25. The system of claim 24, wherein the layers of information are selected from the group consisting of vehicle health information, payload information, vehicle position, vehicle speed and vehicle direction.

26. An article of manufacture comprising a tangible computer readable medium having computer readable program code dispersed therein for tracking the location, movement and activity status of mobile equipment at a remote working site, the computer readable program code comprising a series of computer readable program steps to effect:
   tracking information regarding a location, movement and/or activity status of a respective mobile equipment unit with a mobile computer unit joined to the respective mobile equipment unit;
   storing information regarding the status of the mobile equipment unit on the mobile computer unit joined to the mobile equipment unit, wherein the information regarding the status of the mobile equipment unit is stored within a database on the mobile computer unit, wherein the database contains at least one database;
   mapping the at least one database to an object model used by a logic unit within the mobile computer unit with a programmable mapping system in communication with the logic unit, thereby maintaining a referential integrity within the at least one database;
   assigning tasks for mobile equipment by:
      a first step of creating an assignment set including an ordered queue of the mobile equipment assigned to each loading unit;
      a second step of finding a neediest path which minimizes (mobile equipment travel time)*((average feed rate of the path)-(target feed rate for the path));
      a third step of evaluating cost for allocating each unallocated truck to the path using a weighted algorithm of excess travel time incurred by all trucks in an assignment set, the total truck waiting time incurred by all trucks in the assignment set, and a total loading unit idle time incurred by all shovels in the assignment set;
      a fourth step of for the smallest total truck value for cost, allocating one of the mobile equipment to the assignment set; and
      a fifth step of repeating said second through fourth steps until the assignment set with a minimum total cost is found;
   transmitting information regarding the status of the mobile equipment unit from the mobile computer unit joined to the mobile equipment unit to a central computer unit remote from the working site for incorporation into a first database remote from the working site; and
   synchronizing a plurality of data stored in the mobile computer unit with a plurality of data stored in the first database and synchronizing a plurality of data stored in the first database with a plurality of data stored in a second database accessible by the mobile computer unit;
   whereby the synchronized data stored in the second database is utilized by said mobile computer unit for control when communication between said central computer unit and said mobile computer unit is interrupted, wherein information regarding the status of the mobile equipment unit is used to perform trend analysis of at least one of current data, historical data, or a combination thereof.

27. The article of manufacture of claim 26, further comprising the program steps of:

receiving instruction from the central computer unit at the mobile computer unit;
interrupting communication between the central computer unit and the mobile computer unit; and
directing the mobile equipment to act with the mobile computer unit based on the received instruction and the synchronized data stored in the second database while communication is interrupted.

28. The article of manufacture of claim 26, wherein the step of tracking information further comprises tracking a location of the mobile equipment.

29. The article of manufacture of claim 26, wherein the step of tracking information further comprises tracking functionality data of the mobile equipment.

30. The article of manufacture of claim 26, further comprising the program step of predicting an arrival time for a predetermined destination using the mobile computer unit; and relaying the predicted arrival time to the central computer unit.

31. The article of manufacture of claim 26, wherein information from the mobile computer to the central computer is transmitted periodically.

32. The article of manufacture of claim 26, wherein information from the mobile computer to the central computer is transmitted regularly.

33. The article of manufacture of claim 26, wherein the information includes different layers of information.

34. The article of manufacture of claim 33, wherein the layers of information are selected from the group consisting of vehicle health information, payload information, vehicle position, vehicle speed and vehicle direction.

35. A system for making operational work assignments of respective pieces of equipment at a remote working site comprising:
a central computer unit having access to information in a first database positioned remotely from the site;
at least one equipment computer unit joined with a respective piece of equipment, the at least one equipment computer unit having access to information in a second database at the site~ wherein the second database contains at least one database;
a programmable mapping system in communication with a logic unit within the at least one equipment computer unit and situated to map the at least one database to an object model used by the logic unit and maintain a referential integrity within the at least one database; and
a graphical user interface on the mobile equipment unit, the graphical user interface displaying a map including all roads of the work site, the current locations of all mobile equipment units on the remote working site as well as path information for each loaded mobile equipment unit, the graphical user interface further displaying an audiovisual alarm for misrouted loads as well as GPS velocity information along with real-time comparison with planned values;
at least one wireless communication device enabling communication between said first database and said second database, wherein said first database is updated with information from respective equipment computer units or from said second database;
whereby the central computer issues commands to the respective equipment computer units through the at least one communication device and the respective at least one equipment computer unit temporarily accesses the second database when communication with the central computer unit is temporarily interrupted, wherein information from at least one of the first database and the second database is used to perform trend analysis of at least one of current data, historical data, or a combination thereof.

36. The system of claim 35 further comprising:
the at least one equipment computer unit executing an equipment allocation algorithm independently of the central computer unit while communication with the central computer unit is interrupted.

37. The system of claim 35, wherein information between the at least one equipment computer unit and the central computer is communicated periodically.

38. The system of claim 35, wherein information between the at least one equipment computer unit and the central computer is communicated regularly.

39. The system of claim 35, wherein the information communicated includes different layers of information.

40. The system of claim 39, wherein the layers of information includes vehicle health information or payload information.

41. A method for making operational work assignments of respective pieces of equipment at a remote working site comprising:
utilizing a central computer unit having access to information in a first database positioned remotely from the site;
utilizing at least one equipment computer unit joined with a respective piece of equipment, the at least one equipment computer unit accessing information in a second database at the site, wherein the second database contains at least one database;
mapping the at least one database to an object model used by a logic unit within the at least one equipment computer unit, thereby maintaining a referential integrity within the at least one database;
utilizing at least one wireless communication device to enable communication between said first database and said second database, updating the first database with information from respective equipment computer units or from said second database and updating the second database with information from the first database;
the at least one equipment computer unit collecting and transmitting to the central computer unit data describing known paths along the working site as well as data describing grades and conditions of the paths, wherein data describing the known paths along the working site, paths, and conditions of the paths are collected based on travels of the piece of equipment and communication with the piece of equipment;
issuing commands from the central computer to the respective equipment computer units through the at least one communication device; and,
utilizing the respective at least one equipment computer unit to temporarily issue commands to the respective equipment computer units using access to the second database when communication with the central computer unit is temporarily interrupted, wherein information from at least one of the first database and the second database is used to perform trend analysis of at least one of current data, historical data, or a combination thereof.

42. The system of claim 41 further comprising:
utilizing the at least one equipment computer unit to execute an equipment allocation algorithm independently of the central computer unit while communication with the central computer unit is interrupted.

43. The method of claim 41, wherein information updates/commands are issued periodically.

44. The method of claim 41, wherein information updates/commands are issued regularly.

45. The method of claim 41, wherein the information communicated includes different layers of information.

46. The method of claim 45, wherein the different layers of information are selected from the group consisting of vehicle health information, payload information, vehicle position, vehicle speed and vehicle direction.

* * * * *